(12) United States Patent  (10) Patent No.: US 8,479,281 B2
Yin et al.  (45) Date of Patent: Jul. 2, 2013

(54) AUTHENTICATION MANAGEMENT METHODS AND MEDIA

(75) Inventors: Jianwen Yin, Round Rock, TX (US); Gang Liu, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 784 days.

(21) Appl. No.: 12/055,440

(22) Filed: Mar. 26, 2008

(65) Prior Publication Data

US 2009/0249479 A1 Oct. 1, 2009

(51) Int. Cl.
*G06F 21/00* (2006.01)
(52) U.S. Cl.
USPC .............................. 726/21; 726/28
(58) Field of Classification Search
None
See application file for complete search history.

(56) References Cited

U.S. PATENT DOCUMENTS

| | | | |
|---|---|---|---|
| 5,455,953 A | 10/1995 | Russell | |
| 5,784,560 A | 7/1998 | Kingdon et al. | |
| 5,812,653 A | 9/1998 | Jodoin et al. | |
| 5,926,104 A | 7/1999 | Robinson | |
| 5,991,810 A | 11/1999 | Shapiro et al. | |
| 6,157,636 A | 12/2000 | Voit et al. | |
| 6,249,869 B1 | 6/2001 | Drupsteen et al. | |
| 6,714,987 B1 | 3/2004 | Amin et al. | |
| 6,810,400 B2 | 10/2004 | Kagalwala et al. | |
| 6,898,710 B1 | 5/2005 | Aull | |
| 7,146,635 B2 | 12/2006 | Eggebraaten et al. | |
| 7,185,361 B1 | 2/2007 | Ashoff et al. | |
| 7,194,554 B1 | 3/2007 | Short et al. | |
| 7,197,125 B1 | 3/2007 | Prasad et al. | |
| 7,209,970 B1 | 4/2007 | Everson et al. | |
| 2003/0200300 A1* | 10/2003 | Melchione | 709/223 |
| 2003/0229812 A1* | 12/2003 | Buchholz | 713/202 |
| 2008/0216050 A1* | 9/2008 | Behrendt et al. | 717/104 |
| 2008/0256606 A1* | 10/2008 | Koikara et al. | 726/4 |
| 2009/0132799 A1* | 5/2009 | Brumley et al. | 713/100 |

OTHER PUBLICATIONS

Distributed Management Task Force, Inc., Role Based Authorization Profile, Document No. DSP1039, Oct. 23, 2006, pp. 12-15.
Distributed Management Task Force, Inc., Simple Identity Management Profile, Document No. DSP1034, Oct. 30, 2006, pp. 11-14.

* cited by examiner

*Primary Examiner* — Michael S McNally
*Assistant Examiner* — Carlton Johnson
(74) *Attorney, Agent, or Firm* — Baker Botts L.L.P.

(57) ABSTRACT

A method for managing authentication includes receiving a request at a directory service for authentication from a first of a plurality of users operating a first of a plurality of products, wherein the directory service associates each of the plurality of users with a plurality of roles for each of the plurality of products. The method also includes authenticating the first user utilizing the directory service, wherein the directory service provides a first role associated with the first user and the first product in response to the request.

14 Claims, 4 Drawing Sheets

AUTHENTICATION MANAGEMENT METHODS AND MEDIA

BACKGROUND

1. Technical Field

The present disclosure relates generally to the field of information handling systems. More specifically, but without limitation, the present disclosure relates to managing authentication on information handling systems.

2. Background Information

As the value and use of information continues to increase, individuals and businesses seek additional ways to process and store information. One option available to users is an information handling system (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In a system including one or more IHS(s), a directory service may be integrated for authentication and authorization of users. The one or more IHS(s) may utilize several products, such as hardware or software from one or more vendors, and each of the products may also utilize several services, such as a protocol for expanding data communication possibilities. For example, a directory service may contain a list of users and define the privileges that a user has on a particular product and/or service. However, due to the variety of privileges that may be available in a system of IHSs, the privileges in a directory service may be inconsistent in several ways.

First, there may be inconsistent privilege sets across different products. For example, a first product may provide privileges that may allow a user to only read data, read and write data, and perform administrator operations. A second product may provide privileges that may allow a user to configure a chassis, clear logs, and perform administrator operations. The first and second product may provide some privileges that may be consistent (e.g., administrator operations), but the products may also provide several inconsistent privileges (e.g., read data, read and write data, configure chassis, and clear logs). This may make it very difficult for information technology (IT) administrators to manage various products operating on several IHSs in the same IT environment because each product may require a corresponding privilege object to be created.

Second, for one product providing several services, each different service may require a different concept of privileges. For example, privileges may be verb based or target based. A verb based privilege may define privileges utilizing a specific command (e.g., delete). The specified command may be performed on several products and services. A target based privilege may define privileges utilizing a specific product or service, and the privilege may provide operations that a user may perform for that specific product or service. As a result, a verb based privilege allowing a user to perform delete operations may provide a wider scope than a target based privilege allowing a user to perform a delete operation on a chassis management controller. Therefore, different device classes and privilege classes for different services may need to be defined for a single managed product.

As an example, assume three common roles used by IT administrator may be an administrator, operator, and user. If one product is managed, such as a Dell remote access controller (DRAC), in an IT environment and the product support additional services such as web services for management (WSMAN) and SMCLP (SMASH command line protocol). In order to create an authorization model for users, we may need to create 3 device objects=1(products)×3(services) and 9 privilege objects=1(products)×3(services)×3(roles), which may place a significant burden on an IT administrator.

Thus a need remains for simplified methods and systems for implementing a consistent authorization model for managing user roles and privileges for directory enabled devices and services within a system of one or more IHSs.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

One aspect of the disclosure provides a method for managing authentication includes receiving a request at a directory service for authentication from a first of a plurality of users operating a first of a plurality of products, wherein the directory service associates each of the plurality of users with a plurality of roles for each of the plurality of products. The method also includes authenticating the first user utilizing the directory service, wherein the directory service provides a first role associated with the first user and the first product in response to the request.

Another aspect of the disclosure provides a method for managing authentication for a plurality of information handling systems (IHSs). The method includes providing a directory service indicating a relationship among at least one user, a plurality of roles, and a plurality of products, and classifying each of the at least one user into one of the plurality of roles for each of the plurality of products.

Yet another aspect of the disclosure provides a computer-readable medium having computer-executable instructions for performing a method for managing authentication. The method includes providing a directory service indicating a relationship among at least one user, a plurality of roles, and a plurality of products. Additionally, the method includes classifying each of the at least one user into one of the plurality of roles for each of the plurality of products.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DETAILED DESCRIPTION

Although the invention as been described with reference to specific implementations, it will be understood by those skilled in the art that various changes may be made without departing from the spirit or scope of the invention. Various examples of such changes have been given in the forgoing description. Accordingly, the disclosure of implementations of the disclosure is intended to be illustrative of the scope of the invention and is not intended to be limiting. It is intended that the scope of the invention shall be limited only to the extent required by the appended claims. For example, to one of ordinary skill in the art, it will be readily apparent that the information handling system discussed herein may be implemented in a variety of implementations, and that the forgoing discussion of certain of these implementations does not necessarily represent a complete description of all possible implementations.

For simplicity and clarity of illustration, the drawings and/or figures illustrate the general manner of construction, and descriptions and details of well known features and techniques may be omitted to avoid unnecessarily obscuring the disclosure.

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

Figure 1:
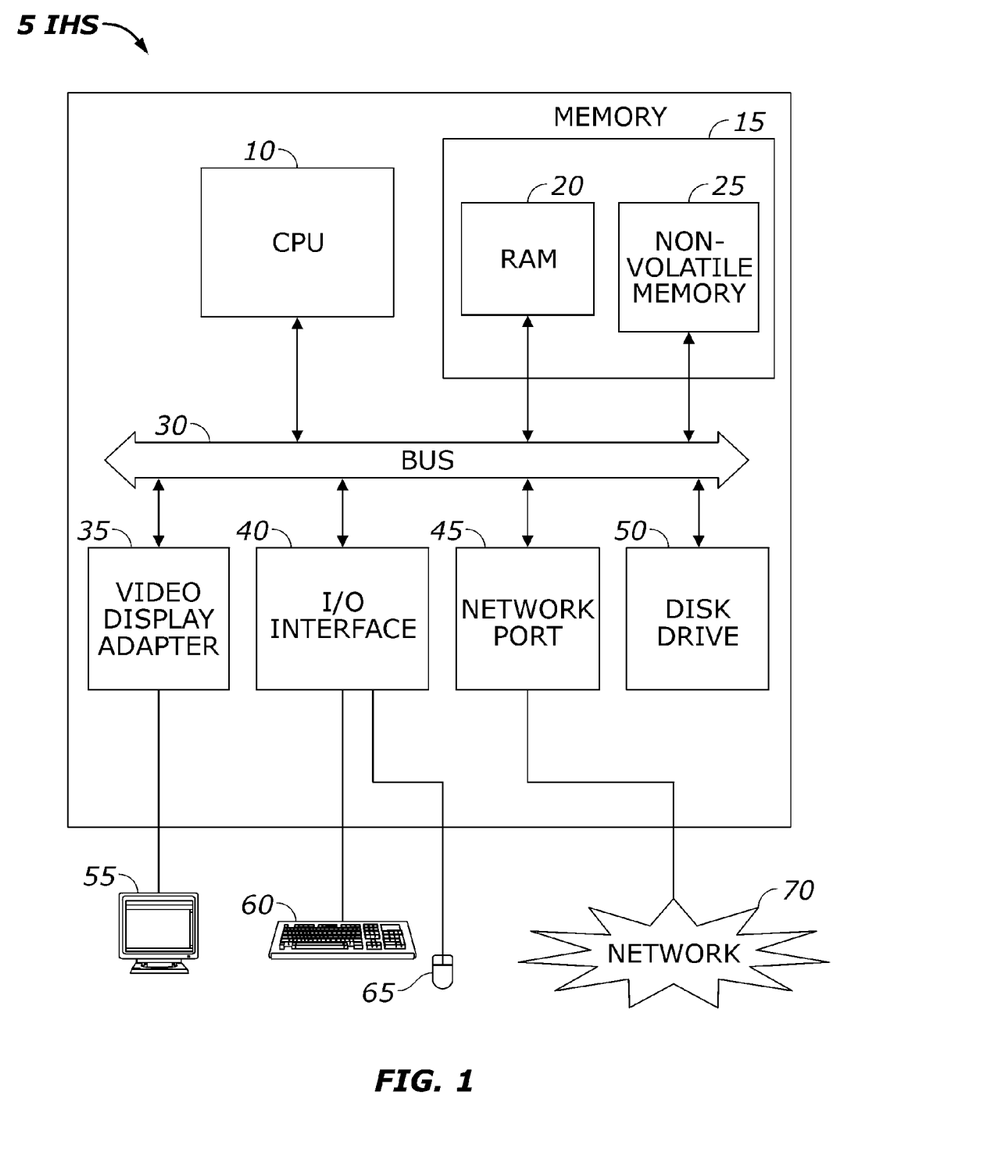
FIG. 1 represents a schematic of an information handling system according to the present disclosure.

FIG. 1 illustrates one possible implementation of an IHS 5 comprising a CPU 10. It should be understood that the present disclosure has applicability to information handling systems as broadly described above, and is not intended to be limited to the IHS 5 as specifically described. The CPU 10 may comprise a processor, a microprocessor, minicomputer, or any other suitable device, including combinations and/or a plurality thereof, for executing programmed instructions. The CPU 10 may be in data communication over a local interface bus 30 with components including memory 15 and input/output interfaces 40. The memory 15, as illustrated, may include non-volatile memory 25. The non-volatile memory 25 may include, but is not limited to, firmware flash memory and electrically erasable programmable read-only memory (EEPROM). The firmware program (not shown) may contain, programming and/or executable instructions required to control a keyboard 60, mouse 65, video display 55 and/or other input/output devices not shown here. The memory may also comprise RAM 20. The operating system and application programs may be loaded into the RAM 20 for execution.

The IHS 5 may be implemented with a network port 45 to permit communication over a network 70 such as a local area network (LAN) or a wide area network (WAN), such as the Internet. As understood by those skilled in the art, IHS 5 implementations may also include an assortment of ports and interfaces for different peripherals and components, such as video display adapters 35, disk drives port 50, and input/output interfaces 40 (e.g., keyboard 60, mouse 65).

Within a system of one or more IHSs, a user may have limited access to specific systems, networks, applications, software, devices, and other components in the system. An authorization model may be utilized in order to manage the authorization privileges of a single or multiple users. A user's authorization privileges may define the specific systems, networks, applications, software, devices, and other additional components that may be accessed/utilized and particular operations that may be performed by that particular user. For example, one common method utilized in an authorization model is a directory service. A directory service may store information regarding several users in a system of one or more IHSs. For each user, a directory service may store data indicating the user's access privileges for each system, network, application, software, device, and other additional components. For example, a directory service may store data indicating that User A is authorized to access system B on network C. However, User A may only be authorized to use an application D, a product E, and a service F on system B. As the number of systems, networks, applications, software, devices, and additional components in a system of one or more IHSs grows, the directory service must store additional information for each user regarding the additional components added. Further, a system, network, application, software, device, or additional component may need to reference the directory service several times before a user is authorized to perform a task or access a component of the system. As a result, the directory service may become cumbersome and difficult to manage with an increasing number of systems, networks, applications, software, devices, and additional components.

A system of one or more IHSs may be managed utilizing object oriented modeling. For example, a common information model (CIM) schema outlined by the distributed management task force (DMTF) may provide a common definition of management information for systems, networks, applications, software, devices, and additional components. The CIM schema may define how managed elements in a system of IHSs are represented as a common set of objects and further define the relationships among the objects. By way of example, in a CIM schema, users, products, services, and directory services may be represented by user objects, device objects, target objects, association objects, or the like. The CIM schema may allow different devices from different manufacturers to operate cooperatively within the same system as described in the CIM schema version 2.17 released on Dec. 14, 2007.

Figure 2:
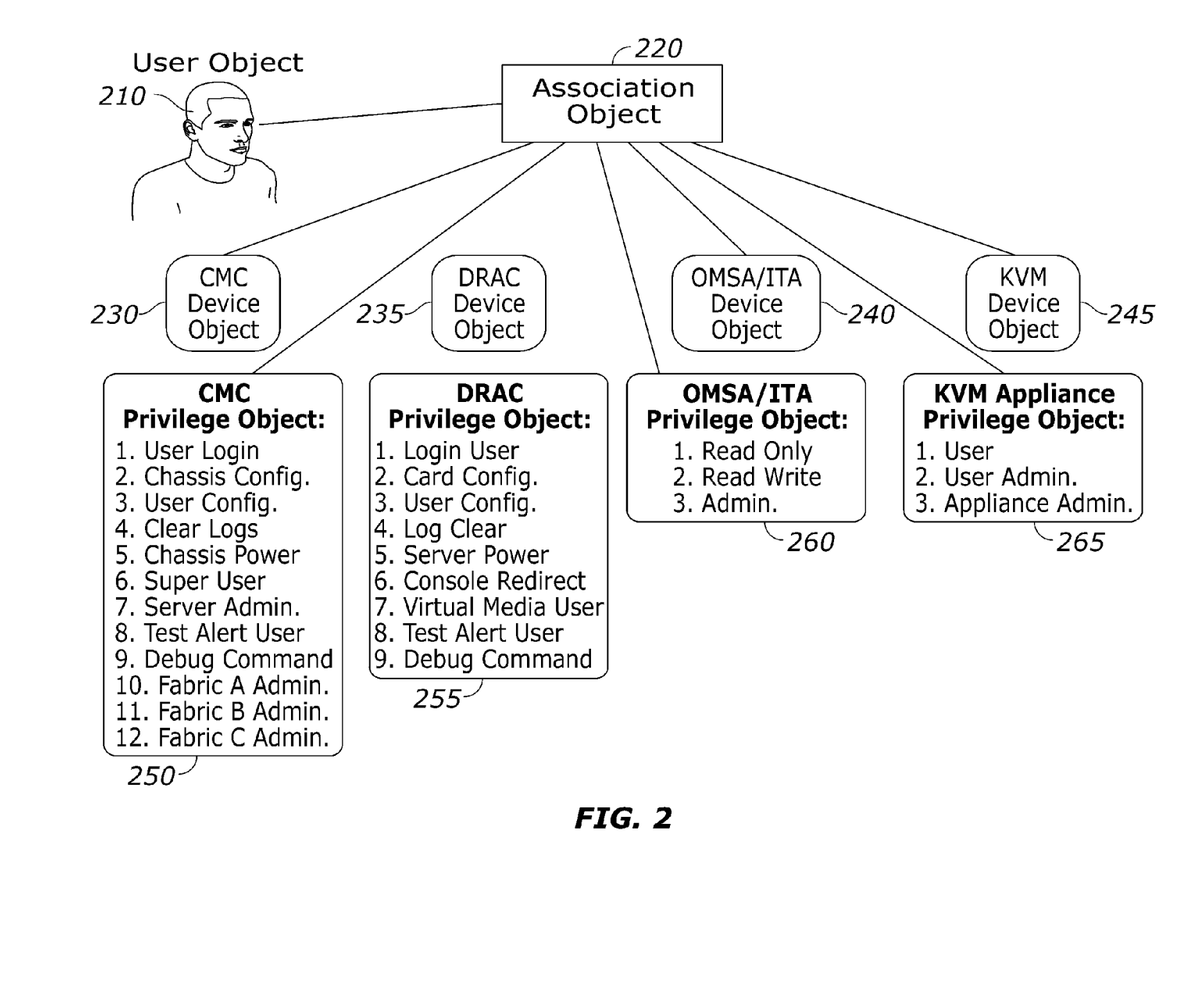
FIG. 2 represents illustrative implementation of a directory service for several different products.

In the illustrative implementation of a directory service for several different products provided in FIG. 2, the users, products, privileges, and directory service may be represented by objects. The objects may be provided in a hierarchy and associations indicating the relationship between the objects. A product may be hardware or software provided by a vendor that may add functionality to one or more IHSs. For example, a product may include, but is not limited to, a chassis management controller (CMC), a Dell remote access controller (DRAC), a baseboard management controller (BMC) bundled with OpenManage server administrator/IT assistant (OMSA/ITA) software, keyboard video mouse (KVM), or the like.

A privilege may indicate a particular right or benefit that may be available to a user. Each product may have a different set of privileges requiring different privilege classes and device classes to be added into a directory service, which may require the creation of privileged objects and device objects. A directory service may be an application that stores and organizes information about users and network resources so that an administrator may manage the privileges of the users for the network resources. For example, a directory service may be represented utilizing an association object describing the relationship between several objects as shown in FIG. 2.

An association object 220 may provide information regarding a relationship among several classes of objects. An association object 220 may indicate the relationship among one or more user object(s) 210 representing one or more users, privileges objects 250-265 for several products, and device objects 230-245 representing several products. A user object 210 may provide information regarding users such as usernames, passwords, and any other suitable user information. As shown in FIG. 2, device objects may represent a particular device in a network including, but are not limited to, a CMC device object 230, a DRAC device object 235, an OMSA/ITA device object 240, and a KVM device object 245.

Each set of privileges may be represented by a privilege object associated with a device object. Examples of privilege objects shown in FIG. 2 may include, but are not limited to, a CMC privilege object 250, a DRAC privilege object 255, an OMSA/ITA privilege object 260, and a KVM appliance privilege object 265. Each privilege object may define access and operation rights for one or more device objects. For example, a CMC device represented by a CMC device object may include privileges such as user login, chassis configuration, user configuration, clear logs, chassis power, super user, etc. represented by a CMC privilege object 250. A DRAC privilege object 255 may include privileges such as login user, card configuration, user configuration, log clear, server power, console redirect, etc. While products such as CMC and DRAC may share some privileges (e.g., user login, user configuration, etc.), the products may also have several privileges that are not shared or that are inconsistent (e.g., super user, console redirect, etc.). The association object 220 may also indicate the particular privileges from the privilege object for which a user has access. For example, an association object 220 may associate a user object 210 with a CMC device object 230 and CMC privilege object 250. Further, the association object 220 may indicate specific privileges (e.g., user login, chassis power, and debug command) provided from the CMC privilege object 250 for the user.

A directory service may additionally provide information regarding several services in a network. A service may provide software for a user or another program acting as an agent for the user or program. The service may allow a user or another program to access resources that may otherwise be unavailable. For example, a service may be software utilizing a standard or protocol, such as SMASH (system management architecture for server hardware) command line protocol (SMCLP), web services for management (WSMAN), or any other suitable standard or protocol, providing access to a controller remotely.

Figure 3:
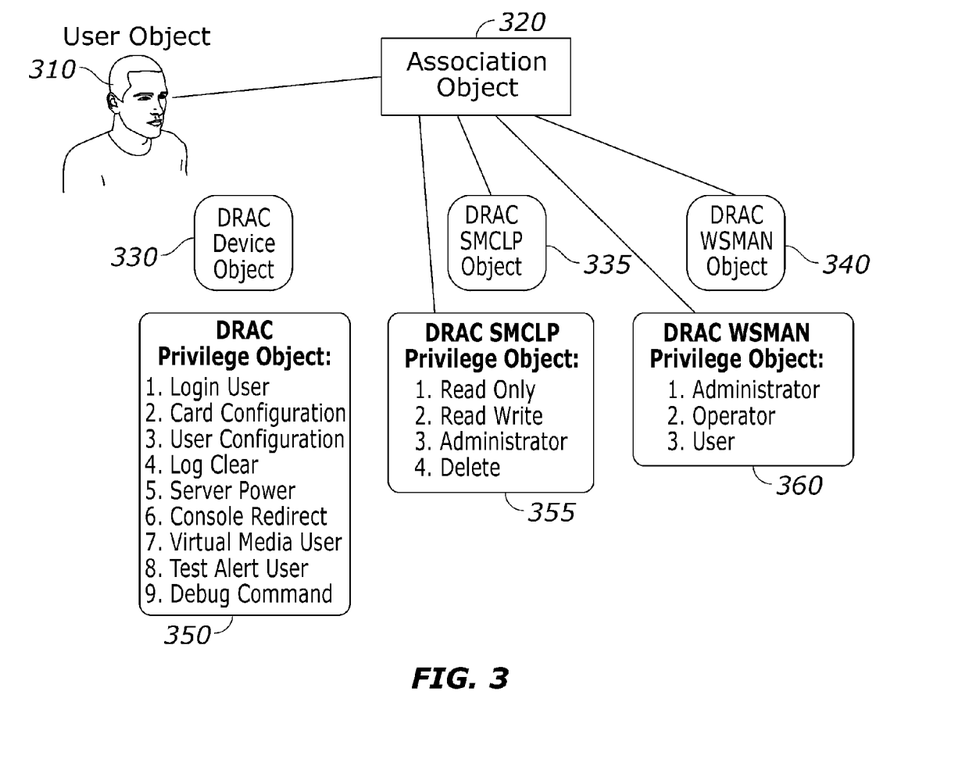
FIG. 3 represents an illustrative implementation of a directory service for a product providing multiple services.

FIG. 3 provides an illustrative implementation of a directory schema for a product providing multiple services. An association object 330 may also indicate the relationship between one or more user object(s) 310, service objects 330-340 for a particular product, and privilege objects 350-360 for the services to specify a user's privileges for each of a product's services. For example, a product such as DRAC may support several services represented by a DRAC device object 330 for DRAC users, a DRAC SMCLP object 335 for SMASH users, and a DRAC WSMAN object 340 for WSMAN users. A DRAC privilege object 350, a DRAC SMCLP privilege object 355, and a DRAC WSMAN privilege object 360 may each define the privileges available to a user of each respective service. While DRAC privileges may be target based, SMCLP privileges may be verb based resulting in a different concept of privileges. For example, a SMCLP user authorized to perform a SMCLP "delete" command could delete configurations related to user accounts for a DRAC card. However, in a DRAC privilege object 350, "User Configuration" and "Card Configuration" are two different privileges that may be required for a DRAC user to be able to perform a similar "delete" commands.

Inconsistency in privilege sets across different devices and different concepts of privileges may complicate a directory service. As an example, assume the three common roles used by IT administrator may be an administrator, operator, and user. Further, four products are managed, such as DRAC, OMSA/ITA, CMC, and KVM, in an IT environment, and all four products support additional services, such as WSMAN and SMCLP, as well as their own service. A directory service may need 12 device objects (e.g., 4(products)×3(services)) and 36 privilege objects (e.g., 4(products)×3(services)×3 (roles)) to manage authorization for this particular configuration, which places a significant burden on an IT administrator.

By defining a consistent authorization model, management of directory objects for all directory enabled devices and services may be simplified. Consistency may be achieved by defining uniform roles in a directory and implementing standard-based authorization profiles in devices/services. Role to privilege mapping may be managed by a product. For standard based services (e.g. SMCLP and WSMAN), mapping can be standardized by implementing a simple identity management profile and a role based authorization profile. While the implementations discussed may involve utilization of the CIM schema, the present disclosure is in no way limited to implementations involving CIM.

Figure 4:
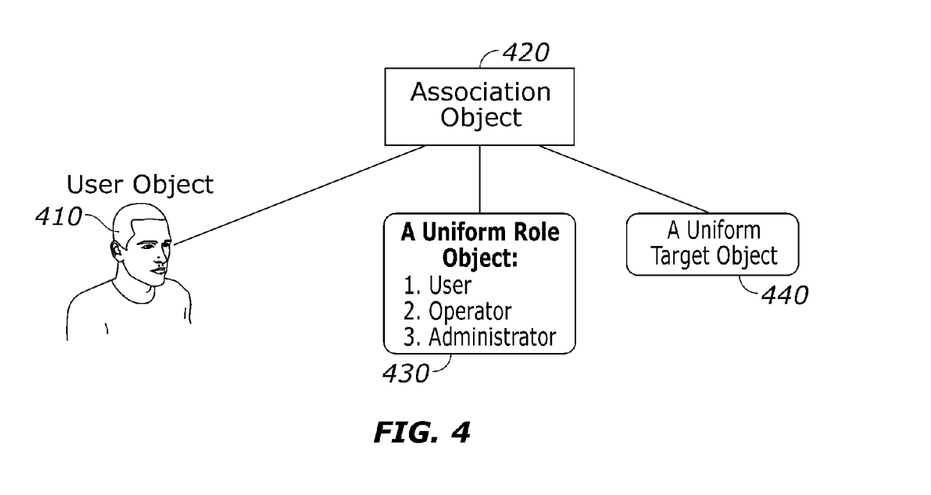
FIG. 4 represents an illustrative implementation of a consistent authorization model.

FIG. 4 represents an illustrative implementation of a consistent authorization model. A uniform class of roles may be defined for every product and service in a system of IHSs. For example, some of the common roles in a system of IHSs may include users, operators, and administrators. Each of the roles may define a user's level of authorization in a system and may be associated with one or more privilege sets in a system of IHSs. For example, a person classified as a "user" may be allowed to operate several applications, but the "user" may not install applications on an IHS. Each of the roles in the uniform class may be represented by a role object 430, and each of one or more products may be represented by a target object 440. An association object 420 and a user object(s) 410 may be utilized to determine a user's role for a target object 440. In other words, an association object 420 may associate a role object 430 with a particular target object 440 for a user object 410. However, in a consistent authorization model, privileges corresponding to a target object 440 may not be provided with the association object as shown in FIG. 2. The product itself may provide the privilege sets which define the privileges available for each role defined by a role object 430. Further, a target object 440 may represent both a product and the services available on the product. Separate objects representing a product and services may not be needed as a result of the uniform class of roles.

By providing a consistent authorization model, much of the complexity of other authorization models may be avoided. First, by defining uniform roles in a directory service for all users, products, and services, product specific privilege sets, such as shown in FIG. 2, may no longer be needed in a directory service. The product itself may provide several privilege sets associated with the available roles in the system of IHSs. Additionally, there may be no need to define different classes of device objects for the different services available for a product as shown in FIG. 3. Uniform class definitions in a directory may result in a schema containing only one target object 430 for each product and the corresponding services for the product. For example, when directory support for services, such as SMASH command line protocol (SMCLP) or web services for management (WSMAN), are added to any products, directory objects may not be needed for the services. The same object representing a product may be utilized for the services for the product, since they are the same managed entity. For example, as discussed previously, if four products support three services, then 12 device objects and 36 privilege objects may be needed when utilizing a traditional authorization model. Only three role objects and four target objects may be needed when utilizing a consistent authorization model for an identical system. To this end, a consistent authorization model may be utilized to support all permutations of products, services, and roles.

It is understood that the roles implemented are in no way limited to the roles discussed herein. In addition to the roles mentioned above, any additional suitable roles may be defined as needed. For example, several roles corresponding to departments in a company, such as sales, marketing, accounting, and research & development, may be defined.

Figure 5:
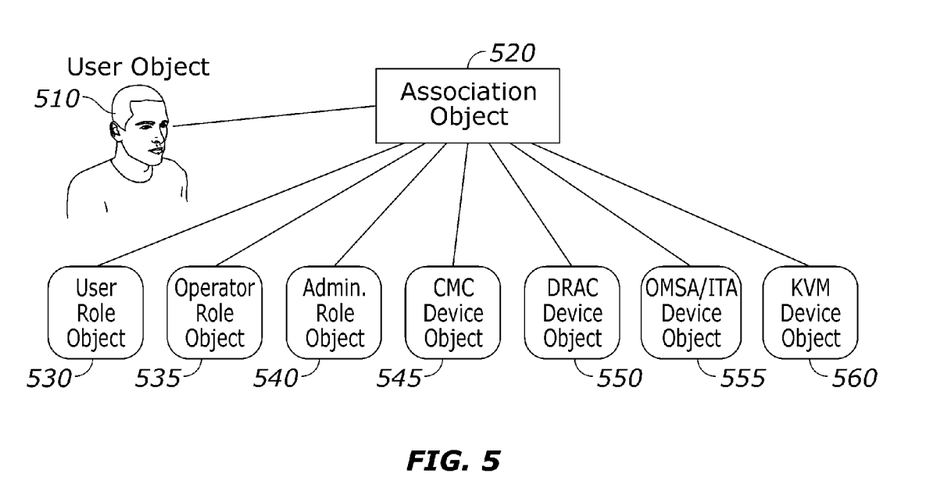
FIG. 5 represents an illustrative implementation of a consistent authorization model for a system of IHSs with four products and three roles.

FIG. 5 represents an illustrative implementation of a consistent authorization model for a system of IHSs with four products and three roles. An association object 520 which provides information regarding an association between two or more objects such as user objects, role objects, and target objects. A system of IHSs may provide several products such as a CMC, DRAC, OMSA/ITA, and KVM. The products in a system of IHSs may be represented by several target objects such as a CMC device object 545, a DRAC device object 550, a OMSA/ITA device object 555, and a KVM device object 560. Additionally, the system of IHSs may provide three roles such as user, operator, and administrator. Three corresponding role objects may be provided such as a user role object 530, operator role object 535, and an administrator role object 540. While there are no objects corresponding to services provided for the products, this does not mean that additional services may not be provided by the products. The object representing a product may also be utilized to represent the services provided by the product. As a result of the consistent roles for all products and services, the services available for a product may also be represented by the product's corresponding target object. For example, a DRAC may provide additional services such as SMCLP and/or WSMAN. Because the roles for SMCLP and WSMAN services for the DRAC are the same as the roles for the DRAC product, the DRAC object may be utilized to represent both the DRAC products and services. By allowing the products and services to be represented by one object and providing roles objects, an authorization model may be greatly simplified.

Privilege objects may no longer be present on a directory server providing a directory service. Each product may provide privilege sets corresponding to the different roles provided by the consistent authorization model. Further, privilege sets for different services may also be provided as well. For example, a product may offer three privilege sets corresponding to three roles such as a user role, an operator role, and an administrator role. By presenting the privileges at the product itself, a consistent authorization model may be created and the product does not require repeated calls to a directory service.

Figure 6:
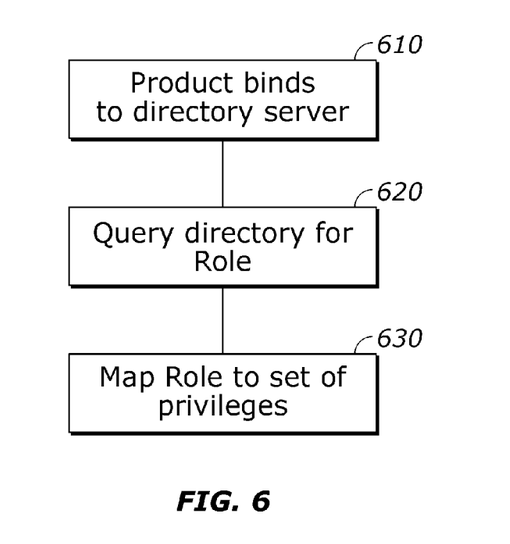
FIG. 6 represents an illustrative method for implementing a consistent authorization model.

FIG. 6 provides an illustrative method for implementing a consistent authorization model. In step 610, a product may perform a lightweight directory access protocol (LDAP) bind to a directory server using a user's login credentials. For example, a user may be authenticated by verifying a user's credentials in a directory accessed by utilizing LDAP or the like. Once the user's credentials have been authorized, a product may utilize LDAP to query a directory server and determine a role of the user on the product being used in step 620. Based on the service utilized, a product maps the role to a set of privileges and authorizes the user to perform operations within that set of privileges in step 630. For standards based services, the mapping may be done by implementing authorization profiles, such as a simple identity management profile and a role based authentication profile.

By implementing a consistent authorization model, a directory query algorithm and source code can be leveraged across all products which may allow a consistent customer usage experience. In addition, deployment and auditing of a directory service may be simplified because the number of objects that need to be created may be reduced. For standard based services, such as WSMAN and SMASH CLP through CIMOM (common information model object manager), role to privilege mapping by a product may be standardized by implementing the simple identity management profile and the role based authentication profile. Further, more granular roles and privileges can be defined at the CIMOM level and authorized through the CIM providers.

In summary, a consistent authorization model as described in the present disclosure may provide a uniform class definition in a directory service to simplify and consolidate role definitions at a high level. Further, the consistent authorization model may provide a flexible mechanism for different protocols/products to extend their role/privilege definitions in a layered fashion. With a layered authentication mechanism proposed, we can reduce the inconsistent role definitions, excessive maintenance, and avoid increasing permutations of privileges and roles in different layers of devices. Thus, a consistent authorization model may also improve scalability and efficiency.

Various methods are contemplated including all or less than all of the steps described herein and/or mentioned above, any number of repeats, and performance of the steps in any order.

Methods of the present disclosure, detailed description and claims may be presented in terms of logic, software or software implemented aspects typically encoded on a variety of media or medium including, but not limited to, computer-readable medium/media, machine-readable medium/media, program storage medium/media or computer program product. Such media may be handled, read, sensed and/or interpreted by an IHS. Those skilled in the art will appreciate that such media may take various forms such as cards, tapes, magnetic disks (e.g., floppy disk or hard drive) and optical disks (e.g., compact disk read only memory ("CD-ROM") or digital versatile disc ("DVD")). It should be understood that the given implementations are illustrative only and shall not limit the present disclosure.

The present disclosure is to be taken as illustrative rather than as limiting the scope or nature of the claims below. Numerous modifications and variations will become apparent to those skilled in the art after studying the disclosure, including use of equivalent functional and/or structural substitutes for elements described herein, and/or use of equivalent functional junctions for couplings/links described herein.

What is claimed is:

1. A computer executable method for managing user-product authentication comprising:
   associating through a directory service within an information handling system (IHS) each of a plurality of users with at least one of a plurality of roles for at least two of a plurality of hardware products;
   receiving a first request through the directory service for authentication from a first of the plurality of users operating a first of the plurality of hardware products
   receiving a second request through the directory service for authentication from a second of the plurality of users operating a second of the plurality of hardware products; and
   authenticating at the IHS the first and second users utilizing the directory service, wherein the directory service provides a first role associated with the first user and the first hardware product in response to the first request and a second role associated with the second user and the second hardware product in response to the second request, wherein each product of the plurality of hardware products is represented by a target object, the first user is represented by a first user object, the second user is represented by a second user object, each role of the plurality of roles is represented by a uniform role object, the directory service is an association object, the first hardware product provides a first plurality of device management services, and the second hardware product provides a second plurality of device management services, wherein the first plurality of device management services is represented by the target object of the first hardware product and the second plurality of device management services is represented by the target object of the second hardware product.

2. The computer executable method of claim 1, wherein the first hardware product includes a plurality of privilege sets, each of the plurality of privilege sets associated with one of the plurality of roles.

3. The computer executable method of claim 2 further comprising:
   receiving the first role from the directory service at the first hardware product; and
   mapping the first role to a first of the plurality of privilege sets corresponding to the first role.

4. The computer executable method of claim 1, wherein the plurality of roles are uniform for all the plurality of hardware products and all the plurality of users.

5. A computer executable method for managing user-product authentication for a plurality of information handling systems (IHSs), the method comprising:
   providing a directory service indicating a relationship among at least two users, a plurality of roles, and a plurality of hardware products; and
   classifying each of the at least two users into one of the plurality of roles for each of the plurality of hardware products, wherein the directory service is an association object, a first user object represents the first user, a second user object represents the second user, a plurality of role objects represent the plurality of roles, and a plurality of target objects representing each of the plurality of hardware products, wherein the association object associates the user object with one of the plurality of role objects for each of the plurality of target objects;
   providing at a first IHS a first plurality of device management services for the first hardware product, the first plurality of device management services represented by a first of the plurality of target objects representing the first hardware product;
   providing at a first HIS a second plurality of device management services for the second hardware product, the second plurality of device management services represented by a second of the plurality of target objects representing the second hardware product; and
   authenticating at a processor within the plurality of IHSs the first user's access to at least a part of the first of the plurality of device management services for the first hardware product based on the first user's corresponding role;
   authenticating at a processor within the plurality of IHSs the second user's access to at least a part of the second of the plurality of device management services for the second hardware product based on the second user's corresponding role.

6. The computer executable method of claim 5 further comprising:
   providing a plurality of privilege sets for a first of the plurality of hardware products, each of the plurality of privilege sets corresponding to one of the plurality of roles.

7. The computer executable method of claim 6, wherein the plurality of privilege sets are provided by the first hardware product.

8. The computer executable method of claim 6 further comprising:
   requesting a first of the plurality of roles from the directory service corresponding to a first user of the at least one user and the first hardware product; and
   mapping the first role to a first one of the plurality of privilege sets corresponding to the first role.

9. The computer executable method of claim 5, wherein the plurality of roles are uniform for all the plurality of hardware products and the at least one user.

10. A non-transitory computer-readable storage medium having computer-executable instructions for performing a method for managing user-product authentication, the method comprising:
    providing a directory service indicating a relationship among at least two users, a plurality of roles, and a plurality of hardware products; and
    classifying each of the at least two users into one of the plurality of roles for each of the plurality of hardware products, wherein the directory service is an association object, a user object represents each of the at least two users, a plurality of role objects represent the plurality of roles, and a plurality of target objects representing each of the plurality of hardware products, wherein the association object associates the user object with one of the plurality of role objects for each of the plurality of target objects;

providing a first plurality of device management services for the first hardware product, the first plurality of device management services represented by a first of the plurality of target objects representing the first hardware product;

providing a second plurality of device management services for the second hardware product, the second plurality of device management services represented by a second of the plurality of target objects representing the second hardware product;

authenticating the first user's access to at least a part of the first plurality of device management services for the first hardware product based on the first user's corresponding role; and authenticating the second user's access to at least a part of the second plurality of device management services for the second hardware product based on the second user's corresponding role.

11. The computer-readable storage medium of claim 10 further comprising:

providing a plurality of privilege sets for a first of the plurality of hardware products, wherein each of the plurality of privilege sets corresponds to one of the plurality of roles.

12. The computer-readable storage medium of claim 11, wherein the plurality of privilege sets are provided by the first hardware product.

13. The computer-readable storage medium of claim 11 further comprising:

requesting a first of the plurality of roles from the directory service corresponding to a first of the at least one user of the first hardware product; and mapping the first role to a first one of the plurality of privilege sets corresponding to the first role.

14. The computer-readable storage medium of claim 10, wherein the plurality of roles are uniform for all the plurality of hardware products and the at least one user.

* * * * *